(12) United States Patent
Zhu et al.

(10) Patent No.: US 10,990,791 B2
(45) Date of Patent: Apr. 27, 2021

(54) FINGERPRINT DETECTION CIRCUIT, FINGERPRINT IDENTIFICATION APPARATUS AND TERMINAL DEVICE

(71) Applicant: SHENZHEN GOODIX TECHNOLOGY CO., LTD., Shenzhen (CN)

(72) Inventors: Yingjia Zhu, Shenzhen (CN); Chang Zhan, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 74 days.

(21) Appl. No.: 16/172,697

(22) Filed: Oct. 26, 2018

(65) Prior Publication Data

US 2019/0251323 A1    Aug. 15, 2019

Related U.S. Application Data

(63) Continuation of application No. PCT/CN2018/076380, filed on Feb. 12, 2018.

(51) Int. Cl.
*G06K 9/00* (2006.01)
*G06K 9/20* (2006.01)
*G01D 5/24* (2006.01)

(52) U.S. Cl.
CPC .............. *G06K 9/0004* (2013.01); *G01D 5/24* (2013.01); *G06K 9/0002* (2013.01); *G06K 9/20* (2013.01)

(58) Field of Classification Search
CPC ...... G06K 9/0004; G06K 9/0002; G06K 9/20; G01D 5/24
See application file for complete search history.

(56) References Cited

U.S. PATENT DOCUMENTS

| | | | |
|---|---|---|---|
| 2009/0021267 A1* | 1/2009 | Golovchenko | G01D 5/24 324/686 |
| 2012/0062817 A1 | 3/2012 | Kanbayashi et al. | |
| 2013/0181949 A1* | 7/2013 | Setlak | G06K 9/0002 345/175 |

(Continued)

FOREIGN PATENT DOCUMENTS

| | | |
|---|---|---|
| CN | 105095710 A | 11/2015 |
| CN | 106462758 A | 2/2017 |

(Continued)

*Primary Examiner* — Antonio Xavier
(74) *Attorney, Agent, or Firm* — Brion Raffoul

(57) ABSTRACT

A fingerprint detection circuit includes: a pixel region and a power grid. The pixel region includes a first pixel region and a second pixel region. The second pixel region is arranged on a periphery of the first pixel region, the first pixel region is provided with a plurality of first pixels, and the second pixel region is provided with a plurality of second pixels. The power grid is arranged below the pixel region, and configured to provide a driving electrical signal for pixel electrodes of the plurality of first pixels and pixel electrodes of the plurality of second pixels, to detect a coupling capacitance formed between the pixel electrodes of the plurality of first pixels and a biological tissue and to cause, via the plurality of second pixels, capacitances of the pixel electrodes of the plurality of first pixels to ground to be consistent.

18 Claims, 3 Drawing Sheets

(56) References Cited

U.S. PATENT DOCUMENTS

| | | | | |
|---|---|---|---|---|
| 2014/0171158 A1* | 6/2014 | Setlak | ................... | G06K 9/0002 |
| | | | | 455/575.1 |
| 2016/0292488 A1* | 10/2016 | Ran | ....................... | G06K 9/0002 |
| 2016/0350577 A1* | 12/2016 | Yang | ................... | G06K 9/00053 |
| 2017/0010129 A1* | 1/2017 | Wyrobek | ................. | G01L 1/148 |
| 2017/0062485 A1* | 3/2017 | Kwon | ................. | H01L 27/1222 |
| 2017/0235992 A1* | 8/2017 | Zhan | .................... | G06F 3/0418 |
| | | | | 382/124 |
| 2017/0286744 A1* | 10/2017 | Chiang | ............... | G06K 9/00053 |
| 2017/0371461 A1* | 12/2017 | Lee | ................... | G02F 1/133512 |
| 2018/0011601 A1* | 1/2018 | Kurasawa | ............. | G06F 3/0412 |
| 2018/0217698 A1* | 8/2018 | Jung | .................... | G06K 9/0002 |
| 2018/0349668 A1* | 12/2018 | Yang | .................... | G06K 9/0002 |
| 2019/0011792 A1* | 1/2019 | Seki | ......................... | H01J 9/205 |
| 2019/0079236 A1* | 3/2019 | Hung | .................. | H01L 51/5237 |
| 2019/0213374 A1* | 7/2019 | Kwon | ..................... | G06F 21/32 |

FOREIGN PATENT DOCUMENTS

| | | |
|---|---|---|
| CN | 106716445 A | 5/2017 |
| CN | 106980850 A | 7/2017 |
| CN | 107077256 A | 8/2017 |
| EP | 3321849 A1 | 5/2018 |

* cited by examiner

US 10,990,791 B2

FINGERPRINT DETECTION CIRCUIT, FINGERPRINT IDENTIFICATION APPARATUS AND TERMINAL DEVICE

CROSS-REFERENCE TO RELATED APPLICATIONS

This application is a continuation of international application No. PCT/CN2018/076380, with an international filing date of Feb. 12, 2018, which is hereby incorporated by reference in its entirety.

TECHNICAL FIELD

Embodiments of the present application relate the technical field of circuits, and in particular, relate to a fingerprint detection circuit, a fingerprint identification apparatus and a terminal device.

BACKGROUND

With the development of fingerprint identification technologies, fingerprint identification chip has gained wide application in various fields. Capacitive fingerprint identification chips have good user experience, small area, low cost, high reliability and the like advantages, and are thus most commonly used fingerprint identification chips.

The capacitive fingerprint identification chip may be arranged on the front side, the rear side, the side surface or the like of a device. Due to different arrangement positions, different shapes are desired for the capacitive fingerprint identification chip. As such, the capacitive fingerprint identification chip has more and more abundant dimensions and shapes. Especially the demands on the miniaturized capacitive fingerprint identification chips are becoming urgent.

In a conventional capacitive fingerprint identification chip, a turn of power ring for supplying power is arranged on a periphery of a pixel region, and effective pixels are arranged in a region enclosed by the power ring. The effective pixels may be configured to sense fingerprint information. However, when the dimension of the capacitive fingerprint identification chip is reduced, the total area of the pixel region is also decreased whereas the area occupied by the power ring is not proportionally decreased with the pixel region. As a result, the area proportion of the effective pixels in the pixel region is decreased when the total area of the pixel region is decreased.

SUMMARY

Embodiments of the present application are intended to provide a fingerprint detection circuit, a fingerprint identification apparatus and a terminal device, to at least solve the above technical problem in the prior art.

In one aspect, embodiments of the present application provide a fingerprint detection circuit. The fingerprint detection circuit includes: a pixel region, the pixel region including a first pixel region and a second pixel region, the second pixel region being arranged on a periphery of the first pixel region, the first pixel region being provided with a plurality of first pixels, and the second pixel region being provided with a plurality of second pixels; and a power grid, the power grid being arranged below the pixel region, the power source grid being configured to provide a driving electrical signal for pixel electrodes of the plurality of first pixels and pixel electrodes of the plurality of second pixels, to detect a coupling capacitance formed between the pixel electrodes of the plurality of first pixels and a biological tissue and to cause, via the plurality of second pixels, capacitances of the pixel electrodes of the plurality of first pixels to ground to be consistent.

In another aspect, embodiments of the present application further provide a fingerprint identification apparatus. The fingerprint identification apparatus includes the above described fingerprint detection circuit.

In still another aspect, embodiments of the present application further provide a terminal device. The terminal device includes the above described fingerprint identification apparatus.

In the technical solutions according to embodiments of the present application, the pixel region includes a first pixel region and a second pixel region. The second pixel region is arranged on a periphery of the first pixel region, the first pixel region is provided with a plurality of first pixels, and the second pixel region is provided with a plurality of second pixels. The power grid is arranged below the pixel region, and the power grid is configured to provide a driving electrical signal for the plurality of first pixels and the plurality of second pixels, to detect a coupling capacitance formed between the pixel electrodes of the plurality of first pixels and a biological tissue and to cause, through the plurality of second pixels, capacitances of the pixel electrodes of the plurality of first pixels to ground to be equal to each other, such that when the area of the pixel region of the fingerprint detection circuit is reduced, the area of the pixel electrodes of the second pixels is also reduced. In addition, after the power grid provides the driving electrical signal, existence of the second pixels causes the capacitances of the pixel electrodes of the plurality of first pixels to ground to be equal to each other, which ensures that the first pixels are all effective pixels. In this way, when the fingerprint detection circuit is miniaturized, an area proportion of the effective pixels of the fingerprint detection circuit may not be reduced.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein.

DETAILED DESCRIPTION

Practice of the present application is described in detail with reference to drawings and specific embodiments, such that the practice of addressing the technical problem using the technical means according to the present application and achieving the technical effects may be better understood and conducted.

Figure 1:
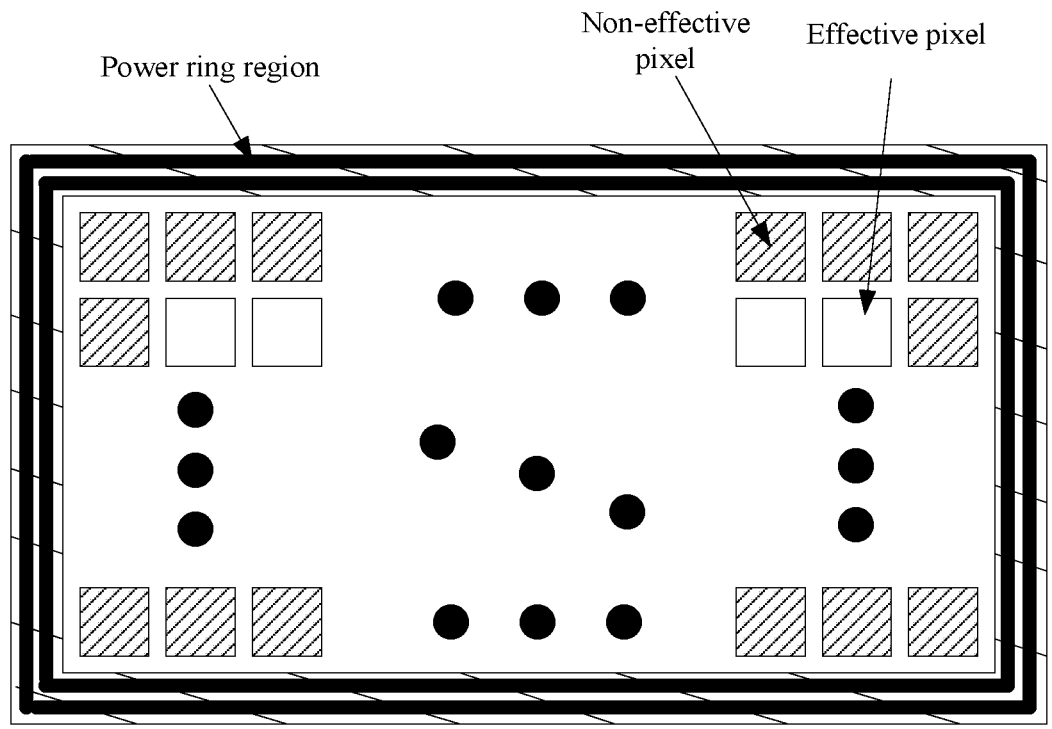
FIG. 1 is a design layout of a pixel region of a fingerprint detection circuit.

FIG. 1 is a design layout of a pixel region of a fingerprint detection circuit. As illustrated in FIG. 1, the pixel region is provided with a pixel array and a power source ring region arranged on a periphery of the pixel array.

In FIG. 1, the pixels in a pixel array includes effective pixels and non-effective pixels, where when a finger touches the pixel array, a coupling capacitance is present between the pixel array and the finger, the effective pixels may be used to determine the coupling capacitance, and the non-effective pixels are pixels on an outermost periphery of the pixel array and are not used to determine the coupling capacitance.

When the fingerprint detection circuit as illustrated in FIG. 1 is applied to a capacitive fingerprint identification chip, with the miniaturization of the capacitive fingerprint identification chip, the area of the pixel region in FIG. 1 becomes smaller and smaller. However, since the power source ring has the functions of supplying power, ensuring consistency of the electric field and bearing currents and the like, the width of a power ring needs to be greater than a predetermined value. As a result, the area occupied by the power ring in the pixel region may not be proportionally decreased with the pixel region. That is, with the decrease of the area of the pixel region, the area occupied by the power ring is increased, and thus the area occupied by the effective pixels is decreased. In this way, the area of the pixel region of the capacitive fingerprint identification chip becomes smaller and smaller, and the area of the effective pixels of the fingerprint identification chip also becomes smaller and smaller. However, the area proportion occupied by the effective pixels is an important indicator for measuring the capacitive fingerprint identification chip, and the decrease of the area proportion of the effective pixels drastically degrades the performance of the miniaturized capacitive fingerprint identification chip.

In view of the above, an embodiment hereinafter of the present application provides a fingerprint detection circuit, to improve the area proportion of the effective pixels in the pixel region. If the fingerprint detection circuit is applied to the capacitive fingerprint identification chip, the area proportion of the effective pixels of the capacitive fingerprint identification chip employing the fingerprint detection circuit may be further improved.

Nevertheless, it should be noted that the technical solutions in the following embodiment of the present application may also be applied to a scenario of non-fingerprint identification. Under inspiration of this embodiment, without departing from the inventive concept of the present application, the technical solution may also be applied to other scenarios of biological feature identification.

Figure 2:
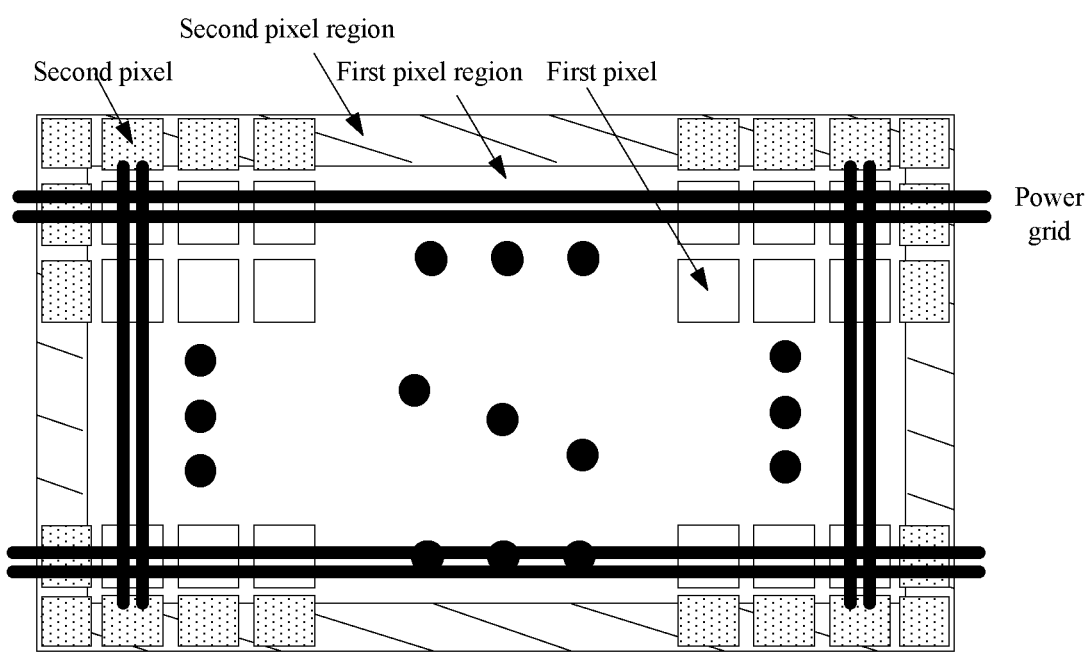
FIG. 2 is a layout of a pixel region of a fingerprint detection circuit according to an embodiment of the present application.

FIG. 2 is a layout of a pixel region of a fingerprint detection circuit according to an embodiment of the present application. As illustrated in FIG. 2, the fingerprint detection circuit includes a pixel region and a power grid.

Wherein, the pixel region includes a first pixel region and a second pixel region, where the second pixel region is arranged on a periphery of the first pixel region, the first pixel region is provided with a plurality of first pixels, and the second pixel region is provided with a plurality of second pixels.

In this embodiment, the pixel region is a rectangular as a whole. In other implementation solutions according to this embodiment, the pixel region may also be another shape as a whole, as long as the application scenario is accommodated, for example, a circular shape or the like, which is not limited in this embodiment.

In this embodiment, the first pixels are effective pixels, and the first pixels include pixel electrodes. When a finger touches the first pixels, a value of the above coupling capacitance may be determined according to the electrical signals on the pixel electrodes of the first pixels. The second pixels are arranged on an outermost periphery of the pixel region, and are not used to determine the coupling capacitance and are thus redundant pixels.

The power grid is arranged below the pixel region, such that the power grid may not occupy the area of the pixel region. The power grid is configured to provide a driving electrical signal for the plurality of first pixels and the plurality of second pixels, to detect a coupling capacitance formed between the pixel electrodes of the plurality of first pixels and a biological tissue and to cause, through the plurality of second pixels, capacitances of the pixel electrodes of the plurality of first pixels to ground to be equal to each other. The term "identical" "equal" herein may indicate that the capacitances are absolutely equal or substantially equal or slightly different from each other.

Optionally, in this embodiment, the power grid may be arranged below the first pixel region; or may be arranged below the second pixel region; or the power grid may be partially arranged below the first pixel region and partially arranged below the second pixel region, as long as the driving electrical signal is provided for the first pixels and the second pixels. When the power grid is arranged below the pixel region, the power grid may be specifically arranged below the pixel region in a predetermined distribution manner. For example, the power grid may be arranged below the first pixel region and/or the second pixel region, such that a voltage drop generated after the driving electrical signal provided by the power grid is transmitted through the power grid and reaches the first pixels and the second pixels is a predetermined voltage value. In this way, the value of the coupling capacitance is detected.

Specifically, for example, the distribution manner of the power grid may be a horizontal distribution or a vertical distribution as illustrated in FIG. 2. Nevertheless, in another specific implementation, the distribution manner of the power grid may be a tree-like distribution.

In this embodiment, as compared with the design layout illustrated in FIG. 1, the power ring is omitted, that is, the power ring is not arranged in the pixel region. Instead, the region where the power ring is arranged in FIG. 1 is provided with a plurality of second pixels. In addition, the first pixels involved in the detection of the value of the coupling capacitance include the region formed by the effective pixels in FIG. 1 relative to the design layout illustrated in FIG. 1. Further, due to presence of the plurality of second pixels, the region formed by the effective pixels in FIG. 1 may be expanded outwardly. The power grid which replaces the power ring in FIG. 1 is arranged below the pixel region to provide the driving electrical signal. Since the capacitances of all the first pixels in the first pixel region to ground are consistent, it is ensured that all the pixels in the first pixel region are effective pixels. Particularly, when the fingerprint detection circuit is miniaturized, the area proportion of the effective pixels of the fingerprint detection circuit may not be decreased, such that the overall area of the first pixels (or referred to as the effective pixels) that are practically involved in the detection of the value of the coupling capacitance is improved, and finally the area proportion of the effective pixels in the pixel regions is increased.

In addition, in the design layout as illustrated in FIG. 1, for implementation of the function of the power ring, it is necessary to ensure that the width of the power ring is greater than a predetermined value (or referred to as an empirical value), which is equivalent to ensuring that the area of the power ring is greater than a predetermined area value. However, in this embodiment, since the power grid replaces the power ring and the power grid is arranged below the pixel region, with respect to the pixel area formed by the plurality of second pixels, the pixel area formed by the plurality of second pixels may be further decreased because the plurality of second pixels are not involved in the detection of the value of the coupling capacitance. For example, the area of an individual second pixel is defined to be less than the area of an individual first pixel, such that the pixel area of the plurality of first pixels is greater than the pixel area formed by the plurality of second pixels as a whole, which further improves the area proportion of the effective pixels. In addition, since the power ring is not used, technical processes relevant to the power ring are avoided, such that the cost of the fingerprint detection circuit is further lowered.

The principle based on which the presence of the second pixels causes the capacitances of the plurality of first pixels to ground to be equal to each other such that all the first pixels are ensured to be effective pixels is described in detail hereinafter.

When the above fingerprint detection circuit is, for example, applied to a capacitive fingerprint identification chip, the capacitive fingerprint identification chip may further include another circuit, for example, a processor, and a wire for connecting to other chips. In this way, the detection of the coupling capacitance may be affected, which is detailed hereinafter.

Referring to FIG. 1, if the power ring is simply removed based on FIG. 1, the non-effective pixels on the outermost periphery may not be involved in the detection of the coupling capacitance. However, the capacitances of the pixel electrodes of the non-effective pixels on the outermost periphery to ground are greatly different from the capacitances of the pixel electrodes of the effective pixels to ground. During determining the coupling capacitance, generally an average capacitance to ground (an average value of the sum of the capacitances of the pixel electrodes involved in the detection of the coupling capacitance to ground, and the pixel electrodes involved in the detection of the coupling capacitance are effective pixels and non-effective pixels) may be subtracted, and then the obtained capacitance is amplified. However, since the difference between the capacitances of the non-effective pixels on the outermost periphery to ground and the capacitance of the effective pixels to ground is great, it is likely that the amplified data exceeds a circuit dynamic range of the fingerprint detection circuit.

In addition, in one aspect, the non-effective pixels on the outermost periphery are subject to greater interference whereas the effective pixels are subject to no interference or less interference; and in another aspect, after the power ring is removed, the effective pixels and the non-effective pixels are arranged at different positions in the pixel region. As a result, the pixel electrodes of the non-effective pixels on the outermost periphery and the pixel electrodes of the effective pixels are greatly different in terms of environment. In this way, comprehensively, the total capacitances (including the coupling capacitances formed between the biological tissue and the pixel electrodes of the non-effective/effective pixels, and the capacitances of the pixel electrodes of the non-effective/effective pixels to ground) of the pixel electrodes of the non-effective pixels on the outermost periphery and the pixel electrodes of the effective pixels before and after the biological tissue touches the pixels are greatly different. Consequently, the accuracy of the detected value of the coupling capacitance formed between the pixel electrodes of the non-effective pixels on the outermost periphery and the biological tissue is low.

The above two factors after the power ring is removed may result in that the pixel electrodes, that is, the non-effective electrodes, on the outermost periphery of the fingerprint detection circuit are extremely not suitable for detecting the value of the coupling capacitance between the biological tissue and the pixel array. In the embodiment as illustrated in FIG. 2, after the power ring as illustrated in FIG. 1 is removed and replaced by the second pixels, the second pixels are the pixel electrodes on the outermost periphery of the fingerprint detection circuit, and the second pixels suffer from the above interference, such that after the power grid provides the driving electrical signal, presence of the second pixels causes the plurality of first pixels to be subject to less interference or even no interference. Particularly, the plurality of first pixels on the outermost periphery of the first pixel region is subject to less interference or even no interference, such that it is ensured that the capacitances of all the first pixels in the first pixel region to ground are consistent. In addition, by arranging the second pixels, the total capacitances formed by the first pixels before and after the biological tissue touches the pixels are slightly different. In this way, all the first pixels in the first pixel region may be the effective pixels for detecting the coupling capacitance.

Figure 3:
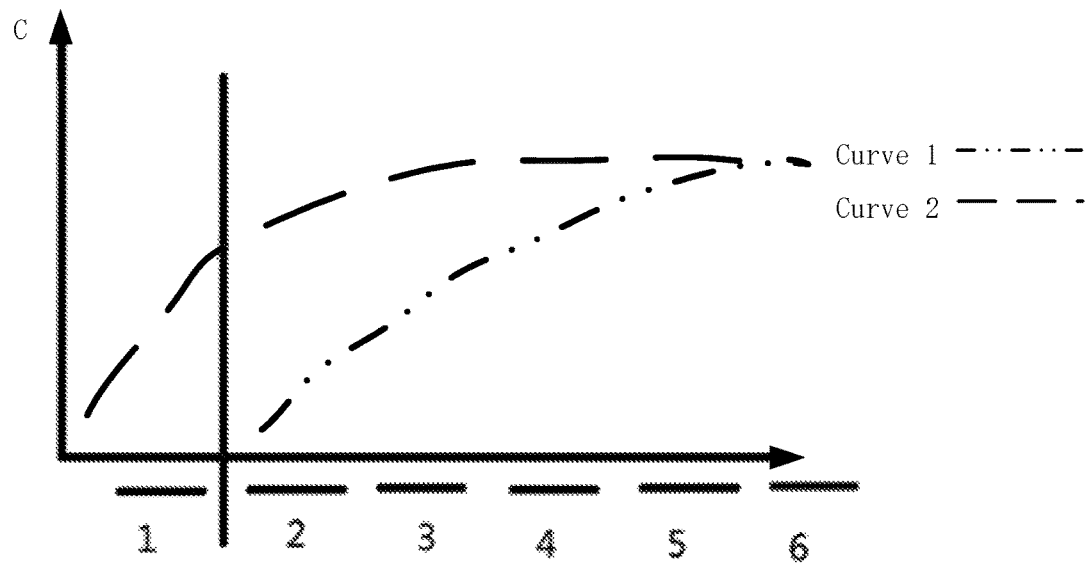
FIG. 3 is a capacitance distribution diagram of pixel electrodes of a fingerprint detection circuit according to an embodiment of the present application.

Specifically, after the power ring as illustrated in FIG. 1 is removed, a capacitance difference (that is, the value of the coupling capacitance) in case of touch/no touch by the biological tissue may be as illustrated by curve 1 in FIG. 3, and a specific method for determining the capacitance difference may be referenced to the embodiment hereinafter. In FIG. 3, the horizontal coordinates represent arrangement positions of the pixels from the outermost periphery to the inner side of the pixel region, and the vertical coordinates represent capacitance differences in case of touch/no touch by the biological tissue). After the power ring is removed, the remaining pixel electrodes are arranged along a direction from the outer periphery to the interior of the pixel region. In FIG. 3, a horizontal coordinate 2 represents a first pixel electrode, a horizontal coordinate 3 represents a second pixel electrode, and so on.

As seen from a curve 1 in FIG. 3, if the power ring is only removed but the second pixel region is not added, the pixel electrodes on the outermost periphery of an effective pixel region is subject to greater interference. As a result, the capacitance differences of the effective pixels in case of touch/no touch by the biological tissue obtained by detecting the effective pixels are greatly different, such that a circuit dynamic range of the fingerprint detection circuit may fail to achieve a full coverage. In this embodiment, the second pixels are arranged in the region where the power ring is originally arranged to replace the power ring, the second pixels are subject to greater interference, and all the original effective pixel electrodes in FIG. 1 are used as the first pixels in this embodiment. In this way, the capacitance differences in cases of touch by touch/no touch by the biological tissue obtained by detecting the first pixels are slightly different, such that the accuracy of the detected value of the coupling capacitance is improved. The curve 2 in FIG. 3 may be referred to for details.

The curve 2 in FIG. 3 indicates a capacitance difference variation diagram in case of touch by the finger or no touch by the finger by detecting the first pixels and the second pixels, when the second pixels are included. In the curve 2, 1 in the horizontal coordinates represents the pixel electrode of the second pixel, 2 in the horizontal coordinates represents the pixel electrode of the $1^{st}$ first pixel after the pixel electrodes are arranged along a direction from the periphery of the first pixel region to the interior thereof, and 2 in the horizontal coordinates represents the pixel electrode of the $2^{nd}$ first pixel, and so on.

As seen from the curve 2 in FIG. 3, when the second pixel region is included, the second pixels are subject to the interference of the pixel region, and subject to electric field attenuation at the edge, such that the capacitance differences in case of touch/no touch by the biological tissue by detecting the first pixels are absolutely the same or approximately the same or slightly different. In this way, it is ensured that the circuit dynamic range of the fingerprint detection circuit achieves a full coverage, and the accuracy of the detected value of the coupling capacitance is improved.

In addition, as illustrated in FIG. 3, if one or two turns of the second pixels are only arranged, interference, which is, however, small, is still caused in the first pixel region. For example, in the curve 2, the capacitance difference represented by 3 in case of touch or no touch by the biological tissue by detecting the pixel electrodes may be merely 15% less than the capacitance differences represented by 4 and 5 in case of touch or no touch by the biological tissue by detecting the pixel electrodes. In this case, if the difference is not ignored, a compensation circuit may be additionally configured. The compensation circuit is configured to perform capacitance compensation for the first pixels adjacent to the second pixels, to improve the accuracy of the detected value of the coupling capacitance. Specifically, capacitance value sampling may be performed for the coupling capacitances of the pixel electrodes of the first pixels, and then capacitance compensation is performed according to a sampling result via a feedback circuit, which is not described herein in this embodiment.

In this embodiment, the working principle of the fingerprint detection circuit is described by using the scenario where the biological tissue is a finger when the fingerprint detection circuit is applied to a capacitive fingerprint identification chip.

In case of no finger touch, the total capacitance of the fingerprint detection circuit includes:

A capacitance CP between the pixel electrode of the first pixel and a system ground of the fingerprint detection circuit;

A capacitance Cnei between pixel electrodes of any two adjacent pixels in the pixel region, that is, a capacitance Cnei is formed between two adjacent first pixels, a capacitance Cnei is formed between two adjacent second pixels, and a capacitance Cnei is also formed between a first pixel and a second pixel that are adjacent to each other;

A capacitance CP_DUM between each of the second pixels and ground; herein, the ground is merely a general term representing a circuit and a wire which causes interference to the fingerprint detection circuit, and a system ground of the fingerprint detection circuit, but is not indicative of the real ground in the physical environment.

Figure 4:
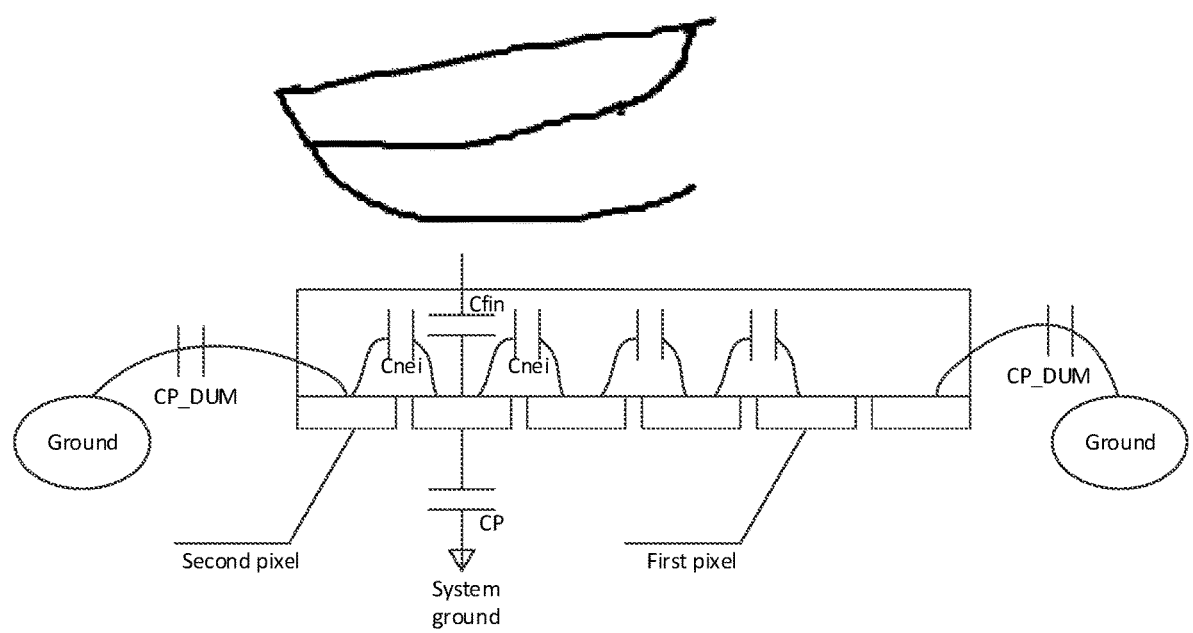
FIG. 4 is a coupling capacitance detection principle diagram of a fingerprint detection circuit according to an embodiment of the present application.

In case of touch by a finger, as illustrated in FIG. 4, the capacitance CP between the pixel electrode of the first pixel and the system ground of the fingerprint detection circuit does not change, the capacitance Cnei between pixel electrodes of any two adjacent pixels in the pixel region changes, and the capacitance CP_DUM is formed between each of the second pixels and ground also changes. As compared with the case of no finger touch, a capacitance Cfin (that is, the coupling capacitance) between the finger and the pixel electrode of the first pixel is added.

In this embodiment, the specific steps of performing capacitance detection for the coupling capacitance between the finger and the pixel electrode of the first pixel are described hereinafter, where the second pixel is not involved in the detection of the coupling capacitance, that is, the detection process does not include the capacitance CP_DUM between the pixel electrode of the second pixel and ground.

Firstly, a spatial capacitance C1 of the fingerprint detection circuit in case of no finger touch is recorded. The spatial capacitance herein includes the capacitance CP between the pixel electrode of the first pixel and the system ground of the fingerprint detection circuit, and the capacitance Cnei between any two adjacent pixels of in the pixel region, that is, C1=CP+Cnei.

Secondly, a spatial capacitance C2 in case of touch by a finger is recorded. The spatial capacitance herein includes a changed capacitance CP' between the pixel electrode of the first pixel and the system ground of the fingerprint detection circuit, a changed capacitance Cnei' between any two adjacent pixel electrodes in the pixel region, and the coupling capacitance Cfin between the finger and the pixel electrode of the first pixel, that is, C2=CP'+Cnei'+Cfin.

In this embodiment, the value of the capacitance CP between the pixel electrode of the first pixel and the system ground may not change with touch by the finger. Therefore, in the data recorded in case of touch by the finger and no touch by the finger, the values of the capacitances CP' and CP do not change.

In this embodiment, during the detection, a time-varying voltage signal is applied to both the pixel electrodes of the first pixel and the second pixel, such that voltage variations of the pixel electrodes of the first pixel and the second pixel are identical, that is, a voltage difference between two poles of the capacitors Cnei and Cnei' is constantly 0, and the capacitors Cnei and Cnei' are subject to no charge and discharge. Therefore, the variation of the capacitance values of the capacitors Cnei and Cnei' may not be detected. In this way, mutual interference of the electrical signals between the pixel electrodes of a plurality of adjacent first pixels are prevented, and interference caused by the electrical signal of the pixel electrode of the second pixel to the pixel electrode of the first pixel may be prevented, and thus the accuracy of the capacitance value detection of the coupling capacitance is ensured.

Finally, it may be determined, according to the above result, that the detected coupling capacitance between the finger and the first pixel may be Cfin+C2−C1 (that is, the capacitance difference in case of touch/no touch by the biological tissue).

In addition, in this embodiment, when the same time-varying voltage signal provided by the power grid to the second pixels and the first pixels is used as the driving electrical signal, a driving circuit of the second pixels may be defined according to the type of a driving circuit of the first pixels.

For example, if the driving circuit of the first pixels is a rectangular wave driving circuit, the fingerprint detection circuit may further include: a switch circuit; where the power grid provides a rectangular wave driving electrical signal for the second pixels via the switch circuit.

Specifically, the switch circuit includes a first switch and a second switch that are connected to the second pixels; where the first switch and the second switch may be driven by a two-phase clock, and the rectangular wave driving electrical signal provided for the second pixels is changed according to turn-on and turn-off states of the first switch and the second switch.

In this embodiment, the driving circuit of the second pixels may be arranged below the second pixel region, and a specific equivalent circuit diagram of the switch circuit may be referenced to the embodiment hereinafter.

In another embodiment of the present application, the fingerprint detection circuit is further provided with a wiring region. For further improvement of the area proportion of the effective pixels of the fingerprint detection circuit, the wiring region may be arranged below the pixel region.

In this embodiment, the wiring region may be specifically configured to define other biases and wirings of the fingerprint detection circuit. For example, when the fingerprint detection circuit is arranged in a capacitive fingerprint identification chip, these biases and wirings may implement connections between the fingerprint detection circuit and other structures and modules in capacitive fingerprint identification chip, for example, a power connection to the capacitive fingerprint identification chip, or a circuit connection to the clock in the capacitive fingerprint identification chip, or the like.

In this embodiment, the second pixels are not involved in the detection of the coupling capacitance, such that a sampling circuit connected to the second pixels does not need to be arranged for the second pixels. When the driving circuit of the second pixels only includes a switch circuit, the driving circuit of the second pixels requires a small space. In this case, the switch circuit may be directly arranged below the second pixel region, and the wiring region may also be directly arranged below the second pixel region.

Nevertheless, the wiring region may be arranged below an entirety of the second pixel region, or may be partially arranged below a part of the second pixel region.

In addition, if the second pixel region is only provided with a single row of the second pixels, it is likely that the second pixel region is small whereas the area of the wiring region is greater than the area of the second pixel region. Therefore, the second pixel region is preferably provided with a plurality of rows of the second pixels, where the plurality of rows of the second pixels define a second pixel sub-region, and the wiring region is below the second pixel sub-region to provide a sufficient area for the wiring region.

Nevertheless, one or more second pixel regions may be included. The second pixel region may be partially provided with a single row of the second pixels, or may be partially provided with a plurality row of the second pixels. For example, based on FIG. 2, a plurality of the second pixels may be arranged on the four corners of the fingerprint detection circuit as illustrated in FIG. 2. The second pixels may be arranged in a triangular shape, whereas the other positions of the fingerprint detection circuit are still provided with a single row of the second pixels, which is not limited in this embodiment. In addition, the single row or the plurality of rows herein does not mean that the plurality of second pixels are in a linear shape after arrangement, which may be also in a curve shape, which is not limited in this embodiment.

In this embodiment, during the detection of the coupling capacitance, the electrical signals of the pixel electrodes of the first pixels may be sampled. Therefore, the fingerprint detention circuit according to this embodiment may further include: a sampling circuit. The sampling circuit may be arranged below the first pixel region to maintain the area proportion of the effective pixels in the pixel region and to provide a sufficient space for the wiring region. The sampling circuit is configured to acquire the electrical signals of the pixel electrodes of the plurality of first pixels, to determine a value of the coupling capacitance formed between the pixel electrodes of the plurality of first pixels and the biological tissue based on the electrical signals of the pixel electrodes of the plurality of first pixels. The specific structure of the sampling circuit is not particularly defined herein.

In addition, it should be noted that for ease of testing the pixel electrodes corresponding to the second pixels on the edge region, the sampling circuit may also be configured to some of the second pixels.

In other implementations of this embodiment, the wiring region is not limited to being arranged below the pixel region, and may also be arranged on a side wall of the fingerprint detection circuit.

Figure 5:
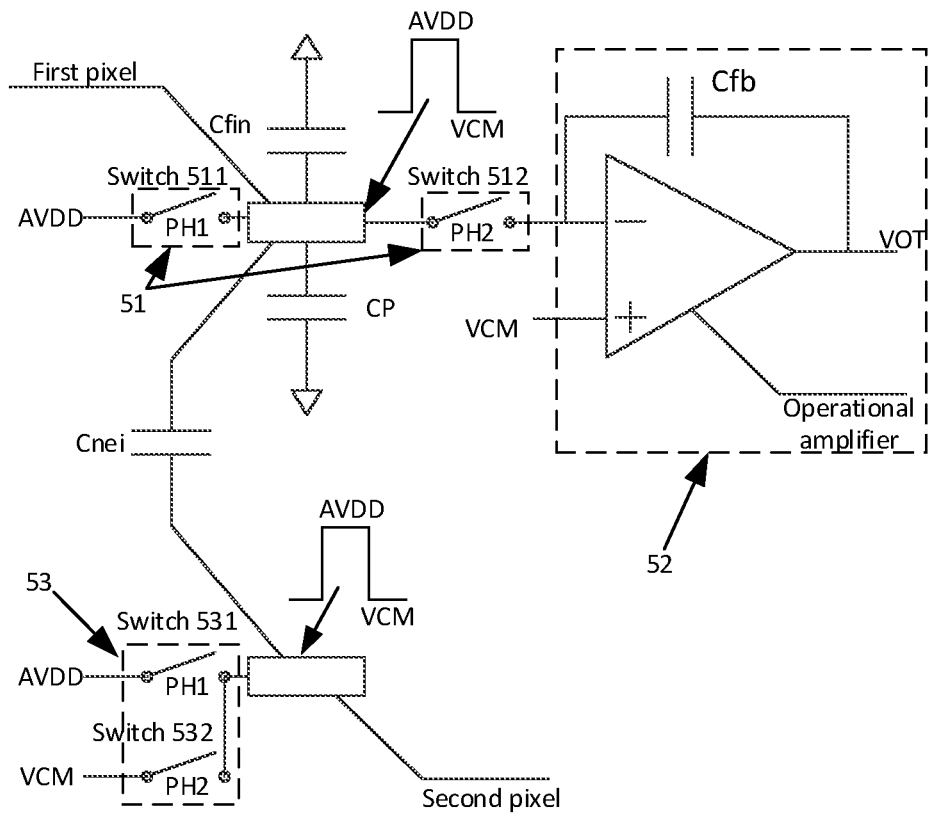
FIG. 5 is an equivalent circuit diagram of a fingerprint detection circuit according to an embodiment of the present application.

FIG. 5 is an equivalent circuit diagram of a fingerprint detection circuit according to an embodiment of the present application. As illustrated in FIG. 5, the fingerprint detection circuit includes a first pixel, a second pixel and a power grid (not illustrated in the drawing), where the power grid supplies power for the fingerprint identification circuit.

A capacitance CP is formed between the pixel electrode of the first pixel and the system ground of the fingerprint detection circuit, and in case of touch by a finger, a capacitance Cfin is formed between the pixel electrode of the first pixel and the finger, a capacitance Cnei is formed between the pixel electrodes of the first pixel and the second pixel, and a capacitance CP_DUM is formed between the pixel electrode of the second pixel and ground. The specific details of the capacitances are similar to those in the above embodiments, which are thus not described herein any further.

As illustrated in FIG. 5, the fingerprint detection circuit further includes a driving circuit 51, a sampling circuit 52 and a switch circuit 53.

The driving circuit 51 and the sampling circuit 52 are connected to the pixel electrodes of the first pixels. A power grid provides a driving electrical signal for the first pixels via the driving circuit 51. The sampling circuit 52 is configured to acquire the electrical signals on the pixel electrodes of the first pixels. The switch circuit 53 is connected to the pixel electrodes of the second pixels, and the power grid provides the driving electrical signal for the pixel electrodes of the second pixels via the switch circuit 53.

The driving circuit 51 includes a switch 511 and a switch 512, and the sampling circuit 52 includes an operational amplifier and a capacitor. One terminal of the switch 511 is connected to the pixel electrode of the first pixel, and the other terminal of the switch 511 is connected to a first voltage AVDD. One terminal of the switch 512 is connected to the pixel electrode of the first pixel, and the other terminal of the switch 512 is connected to an inverting input terminal of the operational amplifier. The inverting input terminal of the operational amplifier is connected to an output terminal OUT of the operational amplifier via the capacitor. A non-inverting input terminal of the operational amplifier is connected to a second voltage VCM. The switch 511 and the switch 512 have opposite turn-on states. When the switch 511 is turned on, the first voltage AVDD is applied to the pixel electrode of the first pixel. When the switch 512 is turned on, virtual short is present between the non-inverting input terminal and the inverting input terminal of the operational amplifier, such that the second voltage VCM is applied to the pixel electrode of the first pixel via the switch 512.

Figure 6:
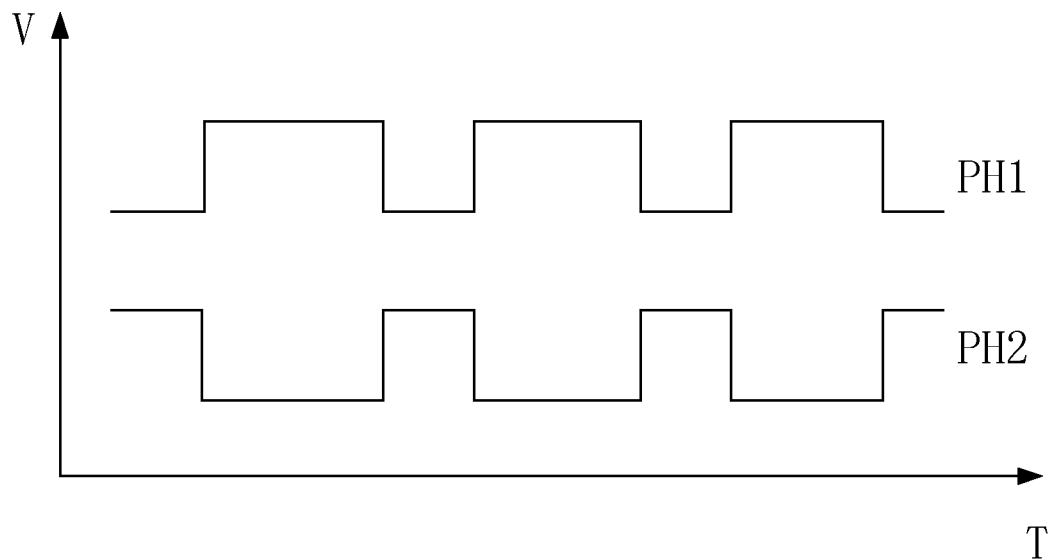
FIG. 6 is a phase variation diagram of a two-phase clock according to an embodiment of the present application.

Specifically, a two-phase clock (PH1 and PH2) is provided in the fingerprint detection circuit. The switch 511 is controlled by a clock circuit PH1, and switch 512 is controlled by a clock circuit PH2. Phase diagrams of the clock circuit PH1 and the clock circuit PH2 are as illustrated in FIG. 6. PH1 and PH2 have opposite phases, such that the switch 511 and the switch 512 have opposite turn-on states. When PH1 is a high level, PH2 is a low level, and the switch 511 is turned on whereas the switch 512 is turned off; on the contrary, when PH1 is a low level, PH2 is a high level, and the switch 511 is turned off whereas the switch 512 is turned on.

In this embodiment, the switch circuit 53 is configured to provide a driving electrical signal for the second pixel, and includes a switch 531 and a switch 532. One terminal of the switch 531 and one terminal of the switch 532 are connected to the pixel electrode of the second pixel, and the other terminal of the switch 531 and the other terminal of the switch 532 are respectively connected to the first voltage AVDD and the second voltage VCM. The switch 531 and the switch 532 are also controlled by the two phases of clocks (PH1 and PH2). The control method is the same as the control method for the switch 511 and the switch 512.

In addition, in this embodiment, the system ground of the fingerprint detection circuit is provided by the power grid. In the above embodiment, the first voltage AVDD and the second voltage VCM are also provided by the power grid. Nevertheless, in other implementations, the first voltage AVDD or the second voltage VCM may be provided by other circuits in the fingerprint detection circuit. For example, the first voltage VADD provided by the power grid is subjected to internal circuit conversion in the fingerprint detection circuit to obtain the second voltage VCM, and are respectively provided for the first pixel and the second pixel, which is not particularly defined in this embodiment.

An embodiment of the present application further provides a fingerprint identification apparatus. The fingerprint identification apparatus includes the above described fingerprint detection circuit.

An embodiment of the present application further provides a terminal device. The terminal device includes the above described fingerprint identification apparatus.

In addition, a person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present application is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A fingerprint detection circuit, comprising:
   a pixel region, the pixel region comprising a first pixel region and a second pixel region, the first pixel region being provided with a plurality of first pixels, and the second pixel region being provided with a plurality of second pixels, the second pixel region being arranged around a periphery of the first pixel region such that, through provision of the second pixels, capacitances to ground of the pixel electrodes of the respective first pixels are substantially equal to each other; and
   a power grid, the power grid being arranged below the pixel region, the power grid being configured to provide a driving electrical signal for the pixel electrodes of the first pixels and pixel electrodes of the second pixels, to detect coupling capacitances formed between the pixel electrodes of the first pixels and a biological tissue, the power grid is further configured to provide a same time-varying voltage signal to both the pixel electrodes of the first pixels and the pixel electrodes of the second pixels as the driving electrical signal of the pixel electrodes of the first pixels and the pixel electrodes of the second pixels such that voltage variation of the pixel electrodes of the first pixels and voltage variation of the pixel electrodes of the second pixels are substantially identical.

2. The fingerprint detection circuit according to claim 1, further comprising a switch circuit; wherein the power grid is configured to provide the driving electrical signal for the second pixels through the switch circuit.

3. The fingerprint detection circuit according to claim 2, wherein the switch circuit comprises a first switch and a second switch; wherein the power grid is configured to provide the driving electrical signal to the second pixels through the first switch and the second switch.

4. The fingerprint detection circuit according to claim 3, wherein the first switch and the second switch are driven through a two-phase clock, and the driving electrical signal is provided for the second pixels by changing turn-on and turn-off states of the first switch and the second switch.

5. The fingerprint detection circuit according to claim 4, wherein the first switch and the second switch are arranged below the second pixel region.

6. The fingerprint detection circuit according to claim 1, wherein a voltage drop generated after the electrical signal provided by the power grid is transmitted through the power grid and reaches the first pixels and the second pixels is a predetermined voltage value.

7. The fingerprint detection circuit according to claim 1, wherein the second pixel is configured to carry interference such that the capacitances to ground of the first pixels are substantially equal to each other, and all the first pixels in the first pixel region are capable of working as effective pixels for detecting the coupling capacitances.

8. The fingerprint detection circuit according to claim 1, further comprising a wiring region; wherein the wiring region is arranged below the pixel region.

9. The fingerprint detection circuit according to claim 8, wherein the wiring region is arranged below the second pixel region.

10. The fingerprint detection circuit according to claim 9, wherein a plurality of rows of the second pixels are arranged in the second pixel region; wherein the plurality of rows of the second pixels define a second pixel sub-region, and the wiring region is below the second pixel sub-region.

11. The fingerprint detection circuit according to claim 10, further comprising a sampling circuit arranged below the first pixel region, and configured to acquire the electrical signals of the pixel electrodes of the plurality of first pixels, to determine a value of the coupling capacitance formed between the pixel electrodes of the plurality of first pixels and the biological tissue based on the electrical signals of the pixel electrodes of the plurality of first pixels.

12. The fingerprint detection circuit according to claim 1, wherein an area of each of the first pixels is greater than that of each of the second pixels; and/or a single row of the second pixels is arranged in the second pixel region.

13. The fingerprint detection circuit according to claim 1, further comprising a compensation circuit; wherein the compensation circuit is configured to perform capacitance compensation for the first pixels adjacent to the second pixels.

14. The fingerprint detection circuit according to claim 1, wherein the power grid is arranged below the pixel region in a predetermined distribution manner, such that a voltage drop generated after the driving electrical signal provided by the power grid is transmitted through the power grid and reaches the first pixels and the second pixels is a predetermined voltage value.

15. A fingerprint identification apparatus, comprising a fingerprint detection circuit, wherein the fingerprint detection circuit comprises:
a pixel region, the pixel region comprising a first pixel region and a second pixel region, the first pixel region being provided with a plurality of first pixels, and the second pixel region being provided with a plurality of second pixels, the second pixel region being arranged around a periphery of the first pixel region such that, through provision of the second pixels, capacitances to ground of the respective first pixels are substantially equal to each other; and
a power grid, the power grid being arranged below the pixel region, the power grid being configured to provide a driving electrical signal for the pixel electrodes of the first pixels and pixel electrodes of the second pixels, to detect coupling capacitances formed between the pixel electrodes of the first pixels and a biological tissue, the power grid is further configured to provide a same time-varying voltage signal to both the pixel electrodes of the first pixels and the pixel electrodes of the second pixels as the driving electrical signal of the pixel electrodes of the first pixels and the pixel electrodes of the second pixels such that voltage variation of the pixel electrodes of the first pixels and voltage variation of the pixel electrodes of the second pixels are substantially identical.

16. The fingerprint identification apparatus according to claim 15, wherein a voltage drop generated after the electrical signal provided by the power grid is transmitted through the power grid and reaches the first pixels and the second pixels is a predetermined voltage value.

17. The fingerprint identification apparatus according to claim 15, wherein the second pixel is configured to carry interference to enable the pixel electrodes of the respective first pixels to have capacitances to ground, and all the first pixels in the first pixel region are capable of working as effective pixels for detecting the coupling capacitances.

18. A terminal device, comprising a fingerprint identification apparatus, the fingerprint identification apparatus comprising a circuit for detecting a fingerprint, wherein the circuit comprises:
a pixel region, the pixel region comprising a first pixel region and a second pixel region, the first pixel region being provided with a plurality of first pixels, and the second pixel region being provided with a plurality of second pixels, the second pixel region being arranged around a periphery of the first pixel region such that, through provision of the second pixels, capacitances to ground of the respective first pixels are substantially equal to each other; and
a power grid, the power grid being arranged below the pixel region, the power grid being configured to provide a driving electrical signal for the pixel electrodes of the first pixels and pixel electrodes of the second pixels, to detect coupling capacitances formed between the pixel electrodes of the first pixels and a biological tissue, the power grid is further configured to provide a same time-varying voltage signal to both the pixel electrodes of the first pixels and the pixel electrodes of the second pixels as the driving electrical signal of the pixel electrodes of the first pixels and the pixel electrodes of the second pixels such that voltage variation of the pixel electrodes of the first pixels and voltage variation of the pixel electrodes of the second pixels are substantially identical.

* * * * *